United States Patent
Uh et al.

(10) Patent No.: US 6,892,437 B2
(45) Date of Patent: May 17, 2005

(54) APPARATUS AND METHOD FOR MANUFACTURING LIQUID CRYSTAL DISPLAY DEVICE

(75) Inventors: Ji Heum Uh, Kyongsangbuk-do (KR); Kyung Su Chae, Kyongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 242 days.

(21) Appl. No.: 10/184,102

(22) Filed: Jun. 28, 2002

(65) Prior Publication Data

US 2003/0172518 A1 Sep. 18, 2003

(30) Foreign Application Priority Data

Mar. 13, 2002 (KR) ......................................... 2002-13529
Mar. 15, 2002 (KR) ......................................... 2002-14184

(51) Int. Cl.[7] ............................................. B23P 23/00
(52) U.S. Cl. .................... 29/564.7; 29/564.6; 29/33 K; 29/33 M; 29/592.1; 29/407.01; 345/192; 345/189; 345/190
(58) Field of Search ......................... 29/564.6–564.8, 29/33 K, 33 M, 561.1, 886, 412, 592.1, 407.01, 407.1; 445/24–25; 216/23; 349/187–192, 153; 141/7

(56) References Cited

U.S. PATENT DOCUMENTS

| | | | |
|---|---|---|---|
| 3,978,580 A | | 9/1976 | Leupp et al. |
| 4,094,058 A | | 6/1978 | Yasutake et al. |
| 4,193,287 A | * | 3/1980 | Pfeiffer .......................... 29/593 |
| 4,501,471 A | * | 2/1985 | Culley et al. ................ 349/158 |
| 4,653,864 A | | 3/1987 | Baron et al. |

(Continued)

FOREIGN PATENT DOCUMENTS

| | | |
|---|---|---|
| EP | 1003066 | 5/2000 |
| JP | 51-065656 | 6/1976 |
| JP | 57038414 | 3/1982 |
| JP | 57088428 | 6/1982 |
| JP | 58027126 | 2/1983 |
| JP | 59-057221 | 4/1984 |
| JP | 59-195222 | 11/1984 |
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 05-154923 | 6/1993 |
| JP | 05265011 | 10/1993 |
| JP | 05281557 | 10/1993 |
| JP | 05281562 | 10/1993 |
| JP | 06051256 | 5/1994 |
| JP | 6160871 | 6/1994 |
| JP | 06-235925 | 8/1994 |
| JP | 06-313870 | 8/1994 |
| JP | 06148657 | 9/1994 |
| JP | 06265915 | 9/1994 |
| JP | 07-084268 | 3/1995 |
| JP | 07128674 | 5/1995 |
| JP | 07181507 | 7/1995 |
| JP | 08095066 | 4/1996 |

(Continued)

Primary Examiner—Erica Cadugan
(74) Attorney, Agent, or Firm—McKenna Long & Aldridge LLP (57) ABSTRACT

A processing line for liquid crystal display fabrication. The process line reduces unnecessary processing steps by removing known defective (NG) individual liquid crystal panels before subsequent processing, with the knowledge about defects depending on stored information.

16 Claims, 5 Drawing Sheets

U.S. PATENT DOCUMENTS

| | | | |
|---|---|---|---|
| 4,691,995 | A | 9/1987 | Yamazaki et al. |
| 4,775,225 | A | 10/1988 | Tsuboyama et al. |
| 5,247,377 | A | 9/1993 | Omeis et al. |
| 5,263,888 | A | 11/1993 | Ishihara et al. |
| 5,379,139 | A | 1/1995 | Sato et al. |
| 5,406,989 | A | 4/1995 | Abe |
| 5,499,128 | A | 3/1996 | Hasegawa et al. |
| 5,507,323 | A | 4/1996 | Abe |
| 5,511,591 | A | 4/1996 | Abe |
| 5,539,545 | A | 7/1996 | Shimizu et al. |
| 5,548,429 | A | 8/1996 | Tsujita |
| 5,642,214 | A | 6/1997 | Ishii et al. |
| 5,680,189 | A | 10/1997 | Shimizu et al. |
| 5,742,370 | A | 4/1998 | Kim et al. |
| 5,757,451 | A | 5/1998 | Miyazaki et al. |
| 5,852,484 | A | 12/1998 | Inoue et al. |
| 5,854,664 | A | 12/1998 | Inoue et al. |
| 5,861,932 | A | 1/1999 | Inata et al. |
| 5,875,922 | A | 3/1999 | Chastine et al. |
| 5,952,678 | A | 9/1999 | Ashida |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,219,126 | B1 | 4/2001 | Von Gutfeld |
| 6,226,067 | B1 | 5/2001 | Nishiguchi et al. |
| 6,236,445 | B1 | 5/2001 | Foschaar et al. |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 6,815,002 | B2 * | 11/2004 | Kweon et al. ............... 427/58 |
| 6,822,701 | B1 * | 11/2004 | Kasahara et al. ........... 349/38 |
| 6,824,023 | B2 * | 11/2004 | Kim et al. ................. 222/504 |
| 2001/0021000 | A1 | 9/2001 | Egami |
| 2004/0017531 | A1 * | 1/2004 | Nagata et al. ............. 349/139 |

FOREIGN PATENT DOCUMENTS

| | | |
|---|---|---|
| JP | 08-101395 | 4/1996 |
| JP | 08106101 | 4/1996 |
| JP | 08171094 | 7/1996 |
| JP | 08190099 | 7/1996 |
| JP | 08240807 | 9/1996 |
| JP | 09005762 | 1/1997 |
| JP | 09026578 | 1/1997 |
| JP | 09-061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-177178 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11-133438 | 5/1999 |
| JP | 11-142864 | 5/1999 |
| JP | 11174477 | 7/1999 |
| JP | 11212045 | 8/1999 |
| JP | 11-248930 | 9/1999 |
| JP | 11-326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000-066165 | 3/2000 |
| JP | 2000-137235 | 5/2000 |
| JP | 2000-147528 | 5/2000 |
| JP | 2000-0035302 | 6/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001117105 | 4/2001 |
| JP | 2001-117109 | 4/2001 |
| JP | 2001-133745 | 5/2001 |
| JP | 2001133794 | 5/2001 |
| JP | 2001-133799 | 5/2001 |
| JP | 2001142074 | 5/2001 |
| JP | 2001147437 | 5/2001 |
| JP | 2001154211 | 6/2001 |
| JP | 2001-166272 | 6/2001 |
| JP | 2001-166310 | 6/2001 |
| JP | 2001-183683 | 7/2001 |
| JP | 2001-209052 | 8/2001 |
| JP | 2001-209060 | 8/2001 |
| JP | 2001-222017 | 8/2001 |
| JP | 2001-235758 | 8/2001 |
| JP | 2001-215459 | 9/2001 |
| JP | 2001255542 | 9/2001 |
| JP | 2001264782 | 9/2001 |
| JP | 2001-201750 | 10/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001330840 | 11/2001 |
| JP | 2001-356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |
| JP | 2002090759 | 3/2002 |
| JP | 2002090760 | 3/2002 |
| JP | 2002107740 | 4/2002 |
| JP | 2002122872 | 4/2002 |
| JP | 2002122873 | 4/2002 |
| JP | 2002080321 | 6/2002 |
| JP | 2002202512 | 7/2002 |
| JP | 2002202514 | 7/2002 |
| JP | 2002214626 | 7/2002 |

* cited by examiner

APPARATUS AND METHOD FOR MANUFACTURING LIQUID CRYSTAL DISPLAY DEVICE

This application claims the benefit of Korean Patent Application Nos. P2002-13529 and P2002-14184, which were respectively filed on Mar. 13, 2002 and Mar. 15, 2002, and which are hereby incorporated by reference.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to liquid crystal display devices. More particularly, the present invention relates to an apparatus and method for manufacturing a liquid crystal display device.

2. Discussion of the Related Art

Following the expansion of the information society, a need has arisen for displays that produce high quality images in thin, lightweight packages that consume little power. To meet such needs, research has produced a variety of flat panel display devices, including liquid crystal displays (LCD), plasma displays (PDP), electro luminescent displays (ELD), and vacuum fluorescent displays (VFD). Some of these display technologies have already been applied in information displays.

Of the various types of flat panel display devices, the LCD is probably the most widely used. In fact, in portable devices, such as notebook PC computers, LCD technology has already replaced cathode ray tubes (CRT) as the display of choice. Moreover, even in desktop PCs and in TV monitors, LCDs devices are becoming more common.

The basic LCD is comprised of opposing substrates and a liquid crystal material that is disposed between the substrates.

Liquid crystal represents a material phase that has properties between liquid and solid. Liquid crystal has the fluidity of a liquid, but the long-range crystal ordering of a solid. Liquid crystal has optical anisotropy due to its long-range crystal ordering and fluidity.

An LCD is manufactured using a number of processes, including array formation, color filter (CF) formation, liquid crystal filling (disposing), and module forming (described subsequently).

Array formation involves depositions, photolithography, and etching to form a thin film transistor (TFT) array on a first substrate (the TFT substrate). Color filter (CF) formation includes forming red, green, and blue color filters in a black matrix, and forming an ITO (Indium Tin Oxide) film that acts as a common electrode on a CF substrate.

The liquid crystal filling (disposing) process involves assembling the TFT substrate and the CF substrate together. Generally, the TFT and color filter substrates are mated to produce a thin gap between substrates. Then, liquid crystal is filled through a gap opening to form a liquid crystal panel.

In module forming, a driving circuit for processing input and output signals is connected to the liquid crystal panel. Additionally, frames are added to complete the liquid crystal module.

LCDs are typically assembled on a production line. In the prior art, cassettes, each having a plurality of TFT substrates or a plurality of color filter substrates, are input to a loader. Each TFT substrate includes a plurality of gate lines that extend in one direction, and a plurality of perpendicularly crossing data lines. Thin film transistors and pixel electrodes are arranged in a matrix at areas between the gate and data lines. The CF substrates each have a black matrix layer, a color filter, and a common electrode. Hence, the black matrix layer shields light leakage except for that desired from the pixel region.

Each TFT substrate or color filter substrate is individually removed from the cassette by the loader and transferred to the input of an alignment layer production line. That line, which includes a hand-programmed robot, forms an alignment layer on the individual substrates, reference alignment process step 1S of FIG. 1.

Step 1S includes cleaning individual substrates to enable formation of a uniform alignment layer coating. Then, an alignment material is coated on the substrate. Then, the alignment material is cured by drying off a solvent in the alignment material, and/or by inducing thermal polymerization of the alignment material. After curing, the alignment material is mechanically rubbed to induce a surface that anchors the liquid crystal in a uniformly align fashion. Finally, a cleaning process is carried out again, resulting in an alignment layer.

After the alignment layer 1S is completed, several processes are performed to produce a gap. Those processes can be carried out in serial or in parallel. The gap forming processes include a cleaning process (step 2S) in which a substrate (TFT or color filter substrate) is cleaned and a spacer scattering process (step 3S) in which spacers are scattered onto that substrate. The spacers are used to maintain the gap thickness constant and uniform.

Figure 1:
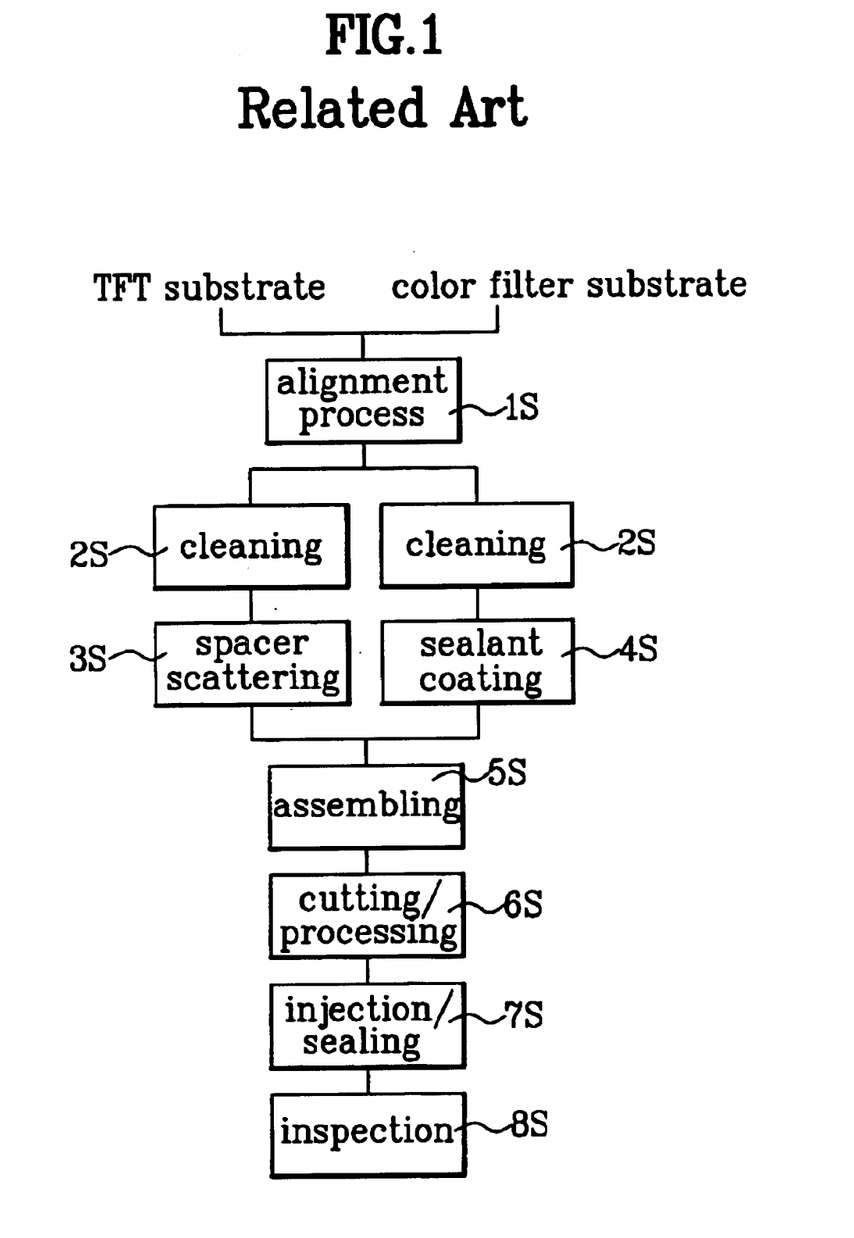
FIG. 1 illustrates a flowchart of LCD fabrication using vacuum injection.

Instead of forming a gap, a sealant coating process (step 4S) can be performed on the substrate (one type of substrate [TFT or CF] undergoes gap forming, the other undergoes sealant coating). After a cleaning step 2S, a sealing material is disposed on a peripheral part of the substrate. The sealing material is subsequently used to attach the TFT substrate to the CF substrate to form an assembled panel. It should be understood that the sealant coating process (4S) is performed on one type of substrate (TFT or CF), while spacer scattering is performed on the other type. Thus, as shown in FIG. 1, the production line has two sub-portions. One sub-portion cleans (step 2S) and scatters spacers (step 3S). The other cleans (step 2S) and produces a seal (step 4S).

After the spacer scattering process 3S and the sealant coating process 4S, an assembling process (5S) that aligns, heats, and presses the TFT substrate and the color filter substrate together to produce an LCD panel is performed. In the assembly process, the TFT substrate and the color filter substrate are arranged in an opposing fashion and then joined to, form an LCD panel.

After the assembly process (step 5S), a cutting process (step 6S) cuts the assembled empty LCD panel into a plurality of unit panels by scribing and breaking the assembled empty panel.

After the cutting process (step 6S) is complete, liquid crystal is filled into the unit panels through a liquid crystal filling hole in the sealing material and the filling hole is then sealed (step 7S).

Finally, after step 7S, the individual liquid crystal unit panels are ground (to removed shorting bars), and inspected, reference step 8S. The liquid crystal cell is then complete.

Figure 2:
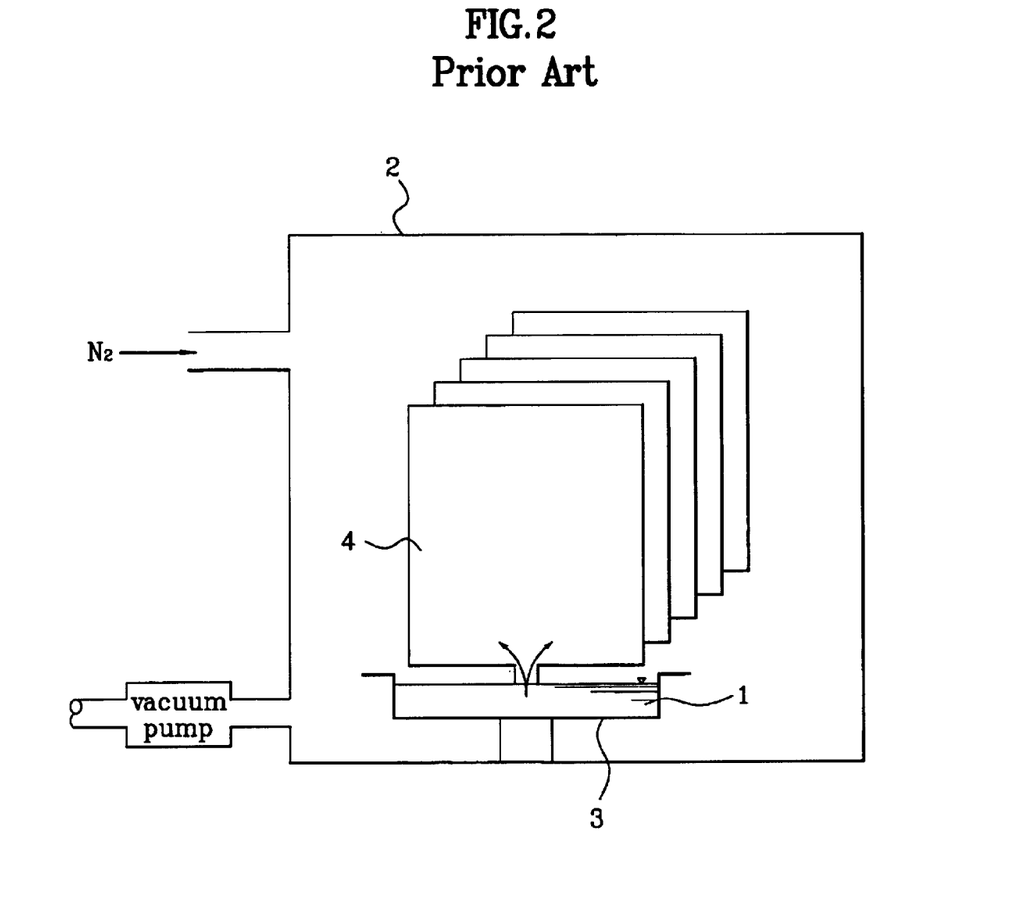
FIG. 2 illustrates vacuum injection as used in the flowchart of FIG. 1.

A typical prior art liquid crystal injection process per step 7S is schematically illustrated in FIG. 2. As shown, liquid crystal 1 is put into a vessel 3. The vessel 3 is inserted in a vacuum chamber 2. The vacuum chamber 2 is evacuated for a period of time to remove water adhering to an inner wall of the vessel 3, water in the liquid crystal 1, and micro bubbles in the liquid crystal 1.

Still referring to FIG. 2, the seal opening of several unit panels 4 are then dipped into the liquid crystal. Inflowing $N_2$ gas produces atmospheric pressure in the chamber 2. The pressure difference between the vacuum in the unit panels 4 and the chamber 2 forces liquid crystal into the unit panels.

After the respective unit panels 4 have been charged with liquid crystal 1, the liquid crystal inlet is sealed. The unit liquid crystal panels are then cleaned. This completes step 7S.

While beneficial, liquid crystal injection using the foregoing procedures has problems. For example, the illustrated liquid crystal injection method requires a long time, such as over 10 hours to fill a ten-inch panel. The injection time is so long because the gap thickness between the substrates is very small and the area to be filled is relatively large. This problem is particularly acute when fabricating a large area LCD. Additionally, the foregoing process wastes liquid crystal due to the fact that excess liquid crystal material cannot be reused because the liquid crystal may be contaminated and/or degraded by impurities and chemical reactions. To overcome such problems a method of applying liquid crystal using a dropping method has been proposed.

The liquid crystal dropping method is briefly explained with reference to FIG. 3. It should be understood that the TFT and color filter substrates are beneficially large glass substrates that include a plurality of substrate panel areas (TFT arrays and color filter arrays) that will eventually form individual LCD displays. In the liquid crystal dropping method, liquid crystal is dropped onto substrate panel areas of a substrate. The dropped liquid crystal will be subsequently spread over the substrate panel areas when the first and second substrates are assembled together.

Figure 3:
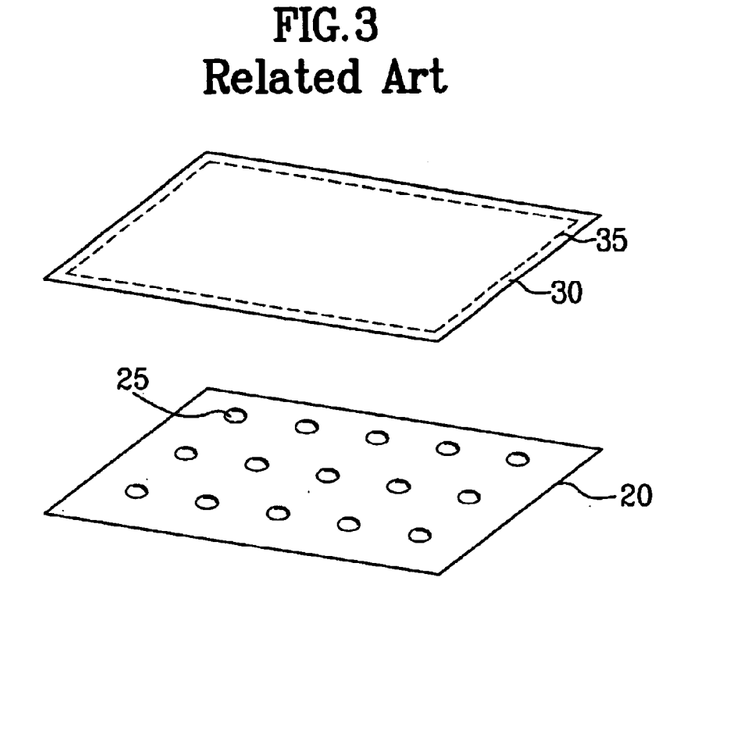
FIG. 3 illustrates a liquid crystal dropping method.

As shown in FIG. 3, liquid crystal 25 is dropped onto the substrate panel areas of a TFT substrate 20 (alternatively, the CF substrate) before assembling the TFT substrate 20 and the substrate 30 together.

Assuming liquid crystal is dropped onto the TFT substrate 20, a sealing material 35 is dispensed onto the periphery of the substrate panel areas of the color filter substrate 30. After the liquid crystal is dropped and the sealing material is dispensed, the TFT substrate 20 and the color filter substrate 30 are assembled together into a liquid crystal panel having a plurality of unit liquid crystal panel areas. Substrate assembly requires aligning, evacuating, and pressing. Assembly pressure forces the liquid crystal to spread out to form a uniform liquid crystal layer in each of the unit liquid crystal panel areas.

In the liquid crystal dropping method, liquid crystal can be quickly dropped (applied) onto the substrate panel areas. Therefore, the liquid crystal dropping method is highly time efficient, particularly for large area liquid crystal panels. Further, since determined amounts of liquid crystal are dropped, liquid crystal consumption is minimized, reducing cost and waste.

Unfortunately, even the liquid crystal dropping method has problems. One set of problems, discussed below, is a result of having multiple substrate panel areas on each substrate.

Figure 4:
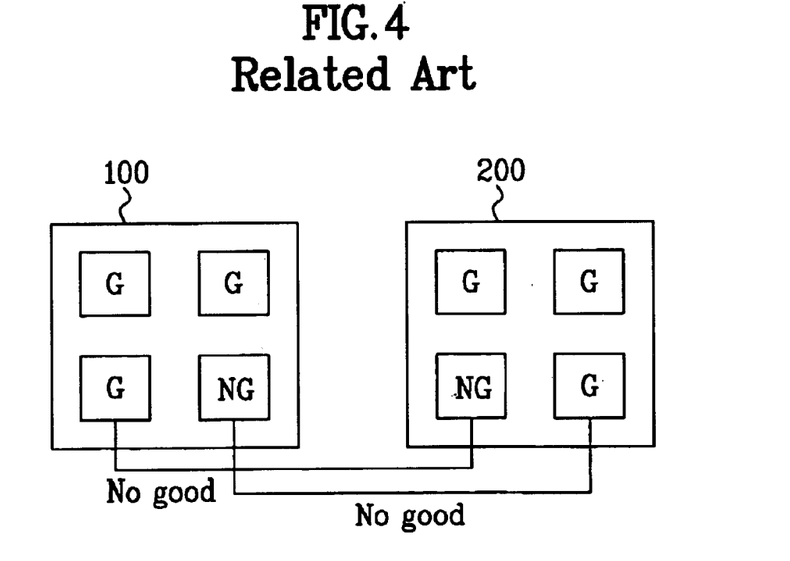
FIG. 4 is an exemplary diagram of substrates having good and NG substrate panel areas.

As previously explained, the TFT substrate and the color filter substrate include a plurality of substrate panel areas that will eventually form a plurality of individual liquid crystal panels. For example, FIG. 4 shows four substrate panel areas on a first substrate 100, and four substrate panel areas on a second substrate 200. Those substrate panel areas will eventually be matched together. Still referring to FIG. 4, the first substrate 100 and/or the second substrates 200 may include a NG (no good/defective) substrate panel area.

After the first substrate 100 and the second substrate 200 are assembled into a composite liquid crystal panel, the unit liquid crystal panel areas having good TFT and good CF substrate panel areas can produce good unit liquid crystal panels. However, a unit liquid crystal panel area having an NG TFT and/or an NG CF substrate panel area is defective.

Moreover, as the number of the substrate panel areas on the substrates increase, more NG substrate panel areas are matched with good substrate panel areas (or with other NG substrate panel areas). After the unit liquid crystal panels are cut into individual liquid crystal panels, unnecessarily processing of NG individual liquid crystal panels, such grinding, cleaning, and testing is performed. This wastes worker's time and increases processing costs.

Therefore, a method of avoiding unnecessary processing of NG individual liquid crystal panels would be beneficial.

SUMMARY OF THE INVENTION

Accordingly, the present invention is directed to an apparatus and method for manufacturing individual liquid crystal panels that substantially obviates one or more problems due to limitations and disadvantages of the related art.

An advantage of the present invention is to provide an apparatus and method for manufacturing liquid crystal panels that avoids unnecessary processes from being carried out.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, in a process line for producing liquid crystal displays that includes a loader and an unloader, the process line includes a first line performing an alignment process, a second line performing a gap forming process, and a third line performing test processes, wherein the third line is a continuous fabrication line.

In another aspect of the present invention, a continuous fabrication line comprises a loading part on which a large composite liquid crystal panel is loaded, a cutting part for dividing the large composite liquid crystal panel into a plurality of individual liquid crystal panels, a buffer part that distinguishes individual liquid crystal panels having at least one NG substrate panel area, beneficially using stored information about NG substrate panel areas, and a grinding part that grinds cutting faces of only good individual liquid crystal panels, wherein the process line is a continuous fabrication line.

In a further aspect of the present invention, a method of fabricating a liquid crystal displays includes the steps of preparing a composite liquid crystal panel having a plurality of unit liquid crystal panel areas, each comprised of mated substrate panel areas. The steps further including producing information regarding NG unit liquid crystal panel areas, which each include at least one NG substrate panel area, and good unit liquid crystal panel areas, which are comprised of good substrate panel areas. Then, dividing the composite liquid crystal panel into a plurality of unit liquid crystal panels by cutting, removing NG liquid crystal panels into a buffer cassette, grinding a face of the good unit liquid crystal panels, and testing the appearance and electrical property of the good liquid crystal panels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 5:
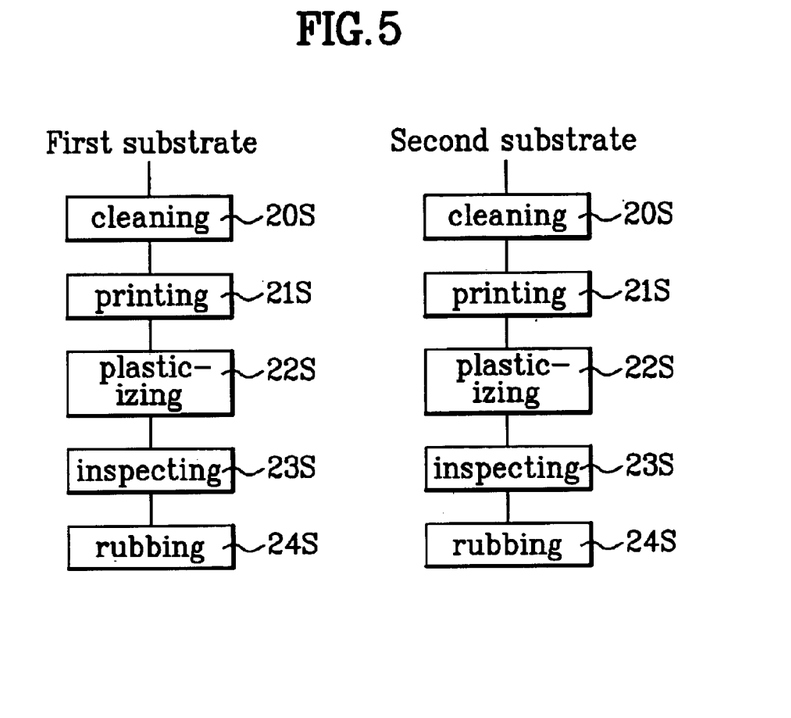
FIG. 5 is a flow chart showing an alignment forming process according to the present invention.
Figure 6:
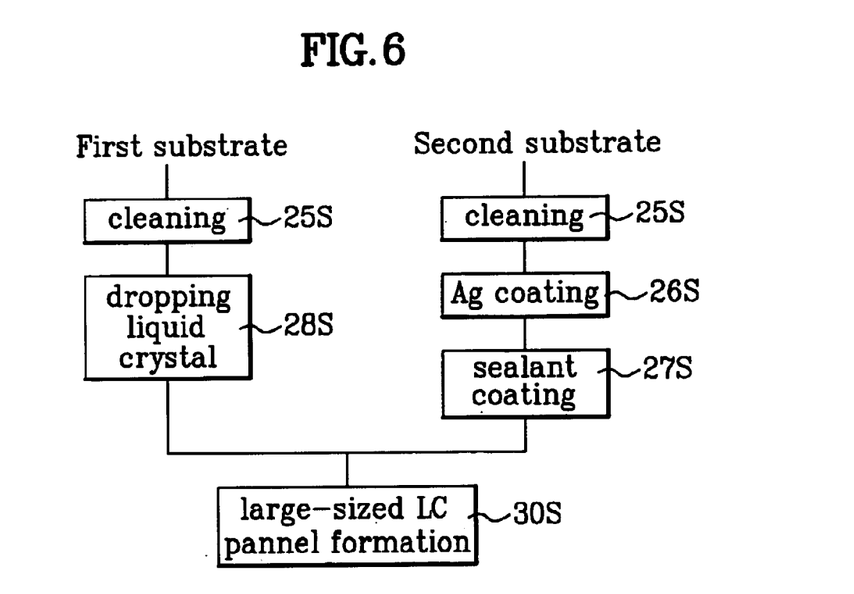
FIG. 6 is a flow chart of a gap forming process according to the present invention.
Figure 7:
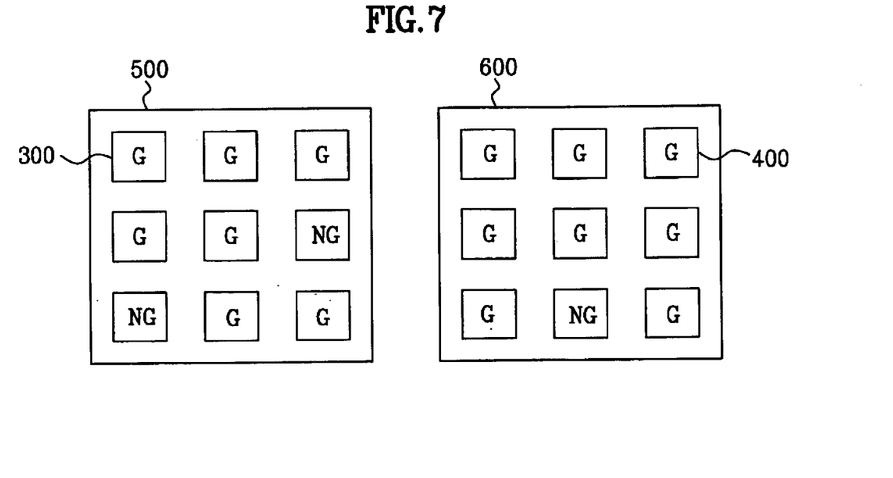
FIG. 7 shows an exemplary diagram of substrates having good and NG substrate panel areas.
Figure 8:
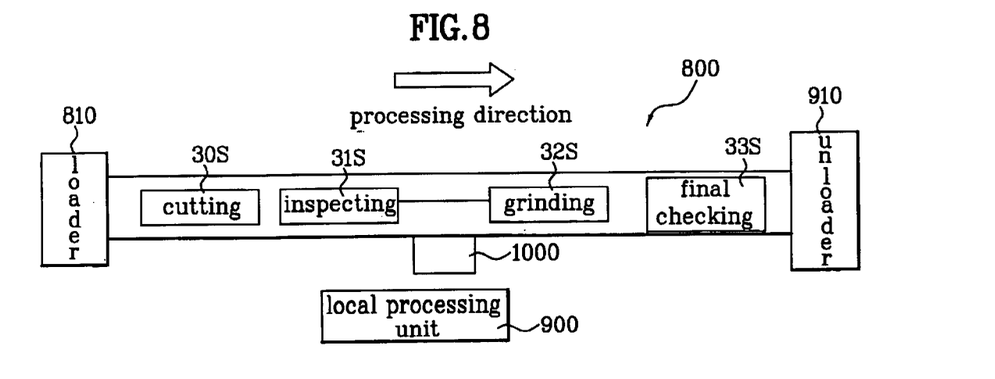
FIG. 8 shows the layout of a processing line according to the present invention.

FIG. 5 is a flow chart showing an alignment process according to the present invention, FIG. 6 is a flow chart of a gap process according to the present invention, FIG. 7 shows an exemplary diagram of substrates having good and no-good (NG) substrate panel areas according to the present invention, and FIG. 8 shows a process layout of a process line according to the present invention.

An array process and a color filter process (not shown) are performed to provide a first substrate and a second substrate, each having a plurality of substrate panel areas. Some of the substrate panel areas are good; some are no-good (NG). The good and NG substrate panel areas can be identified by electrical testing and visual testing. The first substrate and the second substrate include a TFT unit substrate and a CF unit substrate. After the array process and the color filter process are finished, the first substrate and the second substrate are loaded in first and second cassettes and transported to another production line that assembles the first and second substrates together.

A process for fabricating unit liquid crystal areas is described as follows. The overall process involves three separate production lines, each having loaders and un-loaders. Those productions lines include an alignment process line, a gap process line, and a test process line.

The alignment process line carries out a cleaning process, an alignment layer printing process, an alignment layer curing process, a rubbing process, and a testing process. The gap process line carries out a cleaning process, a liquid crystal dropping process, a sealing material dropping process, a vacuum assembling process, and a sealing material curing process. The test process line carries out a scribe/break process, a grinding process, and a liquid crystal panel testing process.

FIG. 5 shows the operation of the alignment process line. A cleaning process 20S is performed to remove particles. Then, an alignment layer coating process 21S prints an alignment layer. In the alignment layer coating process 21S a solution of an alignment material is dropped between a Doctor roll and an Anilox roll that rotates in a dispenser. This alignment material is maintained as a liquid film on the face of the Anilox roll. Alignment material is removed from the Anilox roll to a print roll having a print rubber plate. With the substrate fixed on a coating machine stage, the alignment material on the printing roll is printed onto the substrate.

Still referring to FIG. 5, the plasticizing process 22S cures the alignment layer. In a process 22S, a solvent in the alignment material printed on the substrate is driven off, and/or the alignment material is polymerized.

Still referring to FIG. 5, the inspection process 23S inspects the alignment layer, and a rubbing process 24S rubs the alignment layer to produce an alignment surface. Then, the rubbing process 23S is carried. Finally, the test process 24S tests the alignment layer to locate NG unit substrate areas based on defective alignment layers. For example, NG unit substrate areas can be found from a visual inspection. That information is stored in a computer or other type of processing unit. It should be noted that the alignment process is performed on both the first and second substrates.

After completion of the alignment process, the first substrate and second substrate are un-loader onto third and fourth cassette. Then, the third cassette and the fourth cassette are loaded by a loader of the second processing line that produces gap. The second line is divided into a first gap process line for processing the first substrate, a second gap process line for processing the second substrate, and an assembling line for assembling the first substrate and second substrate. That is, the two separate lines are used for processing the first substrate (say having TFT unit substrate areas) and the second substrate (say with CF unit substrate areas). The assembling line is a continuous line.

A gap process is carried out as follows.

As shown in FIG. 6, the selected substrates are cleaned (25S). The first substrate is passed by a liquid crystal dispensing apparatus, and the second substrate is passed by an Ag dispensing apparatus and a seal dispensing apparatus.

Ag dots are coated, step 26S, on the second substrate for enabling electrical connection between the common electrode of a plurality of the unit CF substrate areas and the pixel electrodes on a plurality of the unit TFT substrate areas. A sealing material is coated, in step 27S, on peripheral portions of each unit CF substrate areas. As a sealing material, a photosensitive resin or a thermally curable resin may be used. After the first substrate and the second substrate are assembled, the sealing material is cured by photo or thermal treatment.

Meanwhile, in the liquid crystal dispensing process, liquid crystal is dropped, step 28S, onto each substrate panel area of the TFT substrate. Those substrate panel areas correspond to substrate panel areas on the CF substrate.

The liquid crystal dropping process 28S is carried out as follows. First, dissolved air in a liquid crystal contained in a liquid crystal container is removed by a vacuum. The liquid crystal container is assembled into a liquid crystal syringe on a head of a liquid crystal dispensing apparatus. Liquid crystal is then dropped to form liquid crystal dots having a uniform pitch on each unit TFT substrate areas.

Referring to step 30S, the first substrate and the second substrate processed by the above processes are loaded into a vacuum chamber and assembled into a composite liquid crystal panel. Here, the liquid crystal is uniformly spread out over the substrate panel areas to form unit liquid crystal panel areas. Thereafter, the seal material is cured to form a composite liquid crystal panel having a plurality of unit liquid crystal panel areas formed from two substrate panel areas.

The assembling process 30S is performed as follows.

First, the first substrate is mounted on a table in a vacuum vessel that enables movement in a horizontal direction, beneficially using a first suction device. Then, the second substrate is affixed by vacuum suction to second suction devices such that the second substrate is over the first substrate. The vacuum chamber is then closed and a vacuum is formed. The second suction device then descends so as to leave a predetermined interval between the first and second substrates. The first substrate is then moved horizontally so as to align with the second substrate.

Subsequently, the second suction device descends such that the second substrate is mated to the first substrate via the sealant. The first and second substrates are then pressurized together such that the unit liquid crystal panel areas are filled with the liquid crystals (which spread across the unit liquid crystal panel areas). Thus, a composite liquid crystal panel having a plurality of unit liquid crystal panel areas is fabricated. Thereafter, the composite liquid crystal panel is removed from the vacuum chamber and irradiated by UV light to cure the sealing material. Testing of the composite liquid crystal panel is then beneficially performed. Information regarding NG unit substrate areas is gathered and stored for subsequent use.

The composite liquid crystal panel has a plurality of unit liquid crystal panel areas the corresponding to the TFT and CF substrate panel areas. FIG. 7 shows nine TFT substrate panel areas 300 and nine CF substrate panel areas 400 that are formed on first and second substrates 500 and 600, respectively. The first and second substrates 500 and 600 may include NG (no good) TFT or CF substrate panel areas produced by the array and color filter forming processes.

Information about the NG substrate panel areas is stored in a central processing unit that handles all information regarding the process lines. Such information is transmitted to a local processing unit of a test process line that will be subsequently later.

Meanwhile, after completing the gap process the composite liquid crystal panel is loaded into the third line. The third line is a continuous production line that cuts the liquid crystal panel into a plurality of individual liquid crystal panels, a grinding process for grinding the cutting faces of the individual liquid crystal-panels, and a test process for checking the appearance of the individual liquid crystal panels and for identifying electric failures.

FIG. 8 illustrates the processing layout of a test line 800 according to the present invention. As shown, a cassette (not shown) holding a plurality of composite liquid crystal panels is arranged on a loader 810. The composite liquid crystal panels are then cut into individual liquid crystal panels.

The cutting process 30S produces a plurality of individual liquid crystal panels by forming grooves having a predetermined depth in the composite liquid crystal panels using a cutting wheel that is pressed at a predetermined pressure into the composite liquid crystal panel. That panel is then cut by propagating a crack downward using an external impact.

Subsequently, an inspection step 31S is performed. That step checks the state of cut portions of the individual liquid crystal panels to determine whether a burr remains along the cut line of the individual liquid crystal panels.

The cut individual liquid crystal panels then pass by a buffer station 1000 on their way to a grinding process, reference step 32S, that grinds the cut faces of the unit liquid crystal panels (32S). However, before the grinding process 32S, according to the embodiment of the present invention, a local processing unit 900 receives information regarding NG unit substrate areas. That information, which is beneficially received from a central processing unit, enables the buffer station 1000 to determine whether a particular individual liquid crystal panel that passes the buffer station 1000 is known to be defective (NG) because it was made from at least one NG substrate panel area.

The unit liquid crystal panels that are not known to be defective (because they were made from good substrate panel areas) pass to the grinding process. However, NG individual liquid crystal panels are removed and stored in a buffer cassette. Units in the buffer cassette are subsequently discarded.

Therefore, the present invention enables a reduction of grinding and subsequent testing by removing known NG individual liquid crystal panel. This enables a reduction in worker fatigue and wasted time in processing defective units.

After grinding, a final checking step 33S checks the appearance and electrical integrity of the individual liquid crystal panels is performed. The individual liquid crystal panels are then unloaded onto cassettes provided in an unloader 910. This completes the fabrication process.

The checking step beneficially includes checking the appearance and A/P (Auto/Probe) testing to determine problems, such as cross-striped stains, black stains, color filter protrusions, oblique stains, rubbing stripes, pin holes, disconnection or electric shorts of gate and data lines. The stained-failure can be checked automatically by a human observer eyes or by using CCD (charge coupled device).

Thereafter, a module process (not shown) attaches a driver IC, a backlight, and the like is carried out.

Accordingly, the process line in a liquid crystal display and fabrication method thereof has the following advantages or effects. The buffer cassette enables storing and handle of NG individual liquid crystal panels based on information regarding NG substrate panel areas, thereby reduce abrasion and testing steps on known defective units, which enables a reduction in worker fatigue and wasted time.

It will be apparent to those skilled in the art than various modifications and variations can be made in the present invention. Thus, it is intended that the present invention covers the modifications and variations of this invention provided they come within the scope ed claims and their equivalents.

What is claimed is:

1. A composite processing line for producing individual liquid crystal displays, comprising:

a first processing line for producing an alignment layer on a first substrate and an alignment layer on a second substrate;

a second processing line for assembling the first substrate to the second substrate such that a liquid crystal is disposed between the first and second substrates; and a third processing line for separating the assembled first and second substrates to produce a plurality of individual liquid crystal panels, for inspecting the individual liquid crystal panels, and for grinding faces of the good individual liquid crystal panel after removing the defective individual liquid crystal panels;

wherein the third processing line is a continuous processing line.

2. The processing line of claim 1, wherein the third processing line includes a cutting device for separating the assembled first and second substrates into a plurality of individual liquid crystal panels.

3. The processing line of claim 2, wherein the third processing line includes a buffer unit having information that identifies defective individual liquid crystal panels, and wherein the buffer unit removes defective individual liquid crystal panels.

4. The processing line of claim 3, wherein the third processing line further includes a grinding device for grinding faces of the individual liquid crystal panels.

5. The processing line of claim 4, wherein the third processing line includes an inspection station for visually and electrically inspecting the individual liquid crystal panels.

6. The process line of claim 1, wherein the second processing line applies the liquid crystal to the first substrate.

7. The process line of claim 1, wherein the second processing line assembles the first and second substrates together after the liquid crystal is applied.

8. The process line of claim 1, wherein defective unit liquid crystal panel areas are identified based on defects in a substrate panel area of one of the first and second substrates, and wherein identification information is stored for later use.

9. The process line of claim 8, wherein the third processing line further includes a local processing unit that receives and stores the identification information.

10. The process line of claim 9, wherein a buffer unit removes the defective individual liquid crystal panels based on the indentification information stored in the local processing unit.

11. The process line of claim 1, wherein the third processing line further includes an inspection device that checks for cutting protrusion on individual liquid crystal panels.

12. A process line for dividing a liquid crystal panel into a plurality of unit liquid crystal panels, comprising:

a loader for receiving a liquid crystal panel;

a cutter for receiving a liquid crystal panel from the loader and for separating the received liquid crystal panel into a plurality of individual liquid crystal panels, wherein some individual liquid crystal panels are good and some are defective;

a buffer unit having information that identifies defective substrate panel areas that form defective individual liquid crystal panels, the buffer unit for removing defective individual liquid crystal panels after cutting; and a grinder for grinding cutting faces of good individual liquid crystal panels after the defective individual liquid crystal panels are remove;

wherein the process line is a continuous fabrication line.

13. The process line of claim 12, wherein the buffer unit includes a local processing unit that receives information from a central processing unit that collects information about the defective individual liquid crystal panels.

14. The process line of claim 13, wherein information about the defective individual liquid crystal panel areas is based on defects in substrate panel areas of one of first and second substrates that together form a liquid crystal panel.

15. The process line of claim 14, wherein defects in the first and second substrates are determined by visually or electrical testing.

16. The process line of claim 12, wherein the process line includes an inspection device that checks for cutting-induced protrusions on good individual liquid crystal panels.

* * * * *